Jan. 30, 1968

I. M. SCARBOROUGH ET AL 3,366,408

SUCKER-ROD COUPLING

Filed Sept. 27, 1965

INVENTORS
IRWIN M. SCARBOROUGH
JAMES C. BROWNING
BY
Cohn and Powell
ATTORNEYS

ABSTRACT OF THE DISCLOSURE

The sucker-rod coupling includes a female sleeve portion which receives a compatible male latch portion having a T-shaped head. The sleeve includes a reciprocally mounted cammed pawl which is activated by the latch and which acts to lock the latch and the sleeve together automatically. Wedge-shaped guides within the lower part of the sleeve portion cooperate with the head of the latch body upon its insertion into the sleeve, and provide a means of aligning the latch body both axially and angularly preparatory to the locking action.

---

This invention relates generally to improvements in a coupling, and more particularly to an improved automatic coupling intended to be used primarily for sucker-rods connected to a reciprocating oil well pump. The coupling is adapted for efficient connection and disconnection of sucker-rods but may, of course, be used for coupling the rods of other, related, mechanical equipment.

An important object is achieved by the provision of a coupling which allows connection and disconnection of sucker-rods from a sub-surface pump in a well at any depth.

Another important object is realized by the provision of a connection which will allow a plunger to be used which is of greater diameter than the tubing string.

Still another important objective is attained by a connection which will allow retrieval of the sucker-rods even when extrication of the sub-surface pump is prevented because of the presence of paraffin or because the sub-surface pump is sanded up or cannot be unseated, thus eliminating costly stripping operations.

An important object is afforded by a connection which allows the plunger to be placed in position at the same time as the lower portion of the tubing string, independently of the sucker-rods. The sucker-rods may then be connected automatically after the plunger is in place in contradistinction to the method whereby the plunger is lowered down the tubing string utilizing the sucker-rods and facing the attendant risk of damage to the plunger because of scoring.

Another important object is provided by a connection incorporating an automatic locking feature which furnishes a simple means of connecting the sucker-rods to the plunger. The provision of means having a clutch action holds the automatic latch in place after the latching has been accomplished. Release or disconnection of the coupling is effected by applying torque to the sucker-rod sufficient to overcome the frictional resistance which holds the latch in place. The resistance of the plunger to rotative movement upon application of this degree of torque causes release without rotative movement of the plunger.

Yet another important objective is realized by the structural arrangement in which the latch body of a male section is received in the socket of the coacting female section, and by the provision of means in the female section that permits operative insertion of the latch body into the socket in one relative angular position of the latch body and female section, and of stop means engaging the tongue to retain the latch body in the socket in another relative angular position of the latch body and female section upon such operative insertion. Means provided in the female section engages and turns the latch body to the last said angular position to couple the male and female sections.

Another important objective is realized by the provision of a pawl mounted in the female section to preclude relative turning, the pawl having a cam engageable with the latch body to turn the latch body to the angular position in which the male and female sections are coupled.

An important objective is attained by the provision of resilient means urging the pawl in a direction to clamp the locking tongue between the pawl and stop means. The pawl pressure and the engagement of opposed pawl cams on follower surfaces at the sides of the locking tongue precludes unintentional relative turning of the latch body and female section to the first or unlocked angular position. Other advantages are obtained in that the locking tongue engages the pawl cam upon operative insertion so as to move the pawl from one limit against loading of the resilient means, the cam under the loading of the resilient means turning the latch body to the locked angular position upon complete insertion to couple the male and female sections.

It is an important object to provide a reciprocative mounting of the pawl in the female section and to provide a connection between the pawl and female section which precludes relative turning, whereby the pawl will move linearly without turning under resilient loading upon complete insertion of the locking tongue so that the pawl cam, engageable with the locking tongue, causes a turning of the latch body to the locked angular position relative to the female section.

An important object is afforded by the provision of a guide means in the socket engageable with the latch body and aligning the latch body and female section in the required relative angular position incident to complete insertion. Specifically, the guide means consists of diametrically opposed wedge-shaped guides engageable with the ends of a transverse locking tongue upon insertion of the latch body.

Another important objective is to provide a coupling of this type that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawing, in which.

Figure 1:
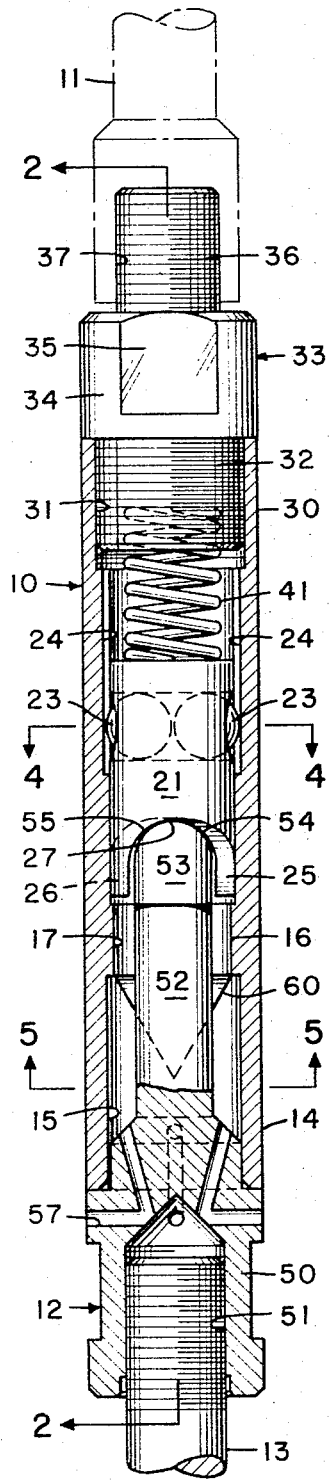
FIG. 1 is a longitudinal elevational view of the coupling showing the male and female portions partially in section.

Referring now by characters of reference to the drawing, and first to FIG. 1, the structure of the coupling providing an automatic connection and semi-manual disconnection between a sucker-rod and a plunger will be described.

The coupling consists essentially of a female section 10 attached to the sucker-rod 11, and a male section 12 which is attached to a plunger-rod 13. Connection is made automatically when the female section 10 is lowered onto the male section 12, over which it interfits and interlocks. The connection is accomplished automatically by the gravitational force applied by the weight of the female section 10 and the sucker-rods 11 above it, and by the latching action of the male section 12 to the inner mechanism of the female section 10 which causes the sucker-rods 11 and female section 10 to turn as a unit automatically through a quarter turn relative to the male section 12.

When the connection of the coupling is made, it is retained by clutch action between the male and female sections 10 and 12 sufficient to resist unintentional relative turning movement between the plunger-rod 13 and the sucker-rods 11.

Release of the coupling is effected by intentionally and forcefully turning the sucker-rods 11 and female section 10 manually through a quarter turn relative to the male section 12. An internal spring mechanism, on removal of the downward pressure, then releases the female section 10 from the male section 12. The inertia of the plunger-rod 13 is sufficient to provide resistance to turning movement of the sucker-rods 11 relative to the plunger-rod 13 when connection or disconnection of the male and female sections 10 and 12 is made.

The female section 10 is an elongate, tubular cylinder, preferably having a uniform external diameter. One end 14 of the female section 10 is bored to provide a socket 15 adapted to receive the male section 12 constituting the latch body. Extending across the socket 15 at a distance from the end of female section 10 is a partition 16. Formed in and through the partition 16 is an oval-shaped slot 17, the purpose and function of which will become apparent upon later description of parts. At opposite sides of the slot 17, the partition 16 forms stop shoulders 20. The slot 17 constitutes a space between the stop shoulders 20.

Reciprocatively mounted in the female section 10 above the partition 16 is a pawl 21 consisting of a cylindrical body of uniform diameter. The body of pawl 21 is provided with a circular hole 22 formed transversely therethrough and perpendicular to the longitudinal axis of movement of such pawl 21, the hole 22 being of sufficient diameter to accommodate and allow the movement of a pair of ball bearings 23 constituting rollers. The ball bearings 23 extend outwardly from the body of pawl 21 to ride freely in a pair of longitudinal grooves 24 constituting tracks formed internally at diametrically opposed locations in the female section 10. The ball bearings 23 travelling in the longitudinal grooves 24 constrain the pawl 21 to a longitudinal movement and preclude any relative turning of the pawl 21 and female section 10.

Figure 2:
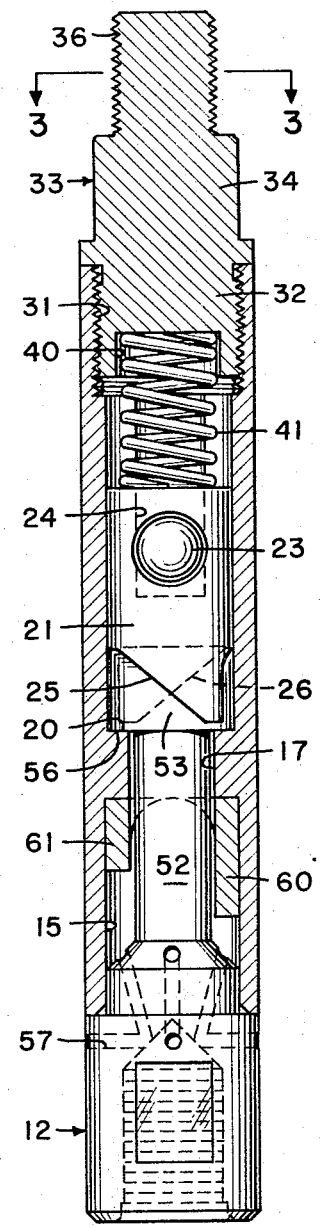
FIG. 2 is a longitudinal elevational view taken at line 2—2 of FIG. 1.

The lower end of pawl 21 is provided with oppositely facing and disposed cams 25 and 26 curved upwardly and around approximately 90 degrees to merge with a groove 27 therebetween, the groove 27 being orientated transversely to the longitudinal axis of the oval-shaped slot 17. When viewed from the side, as seen in FIG. 2, the cams 25 and 26 are diagonally disposed and cross to provide a common soffit therebetween from which access is obtained to both cams 25 and 26.

The upper end 30 of the female section 10 is provided with internal threads 31 to receive a threaded stub 32 of a top fitting 33, the body 34 of fitting 33 being provided with diametrically opposite flat faces 35 selectively engageable by a suitable tool for threadedly connecting the stub 32 with the female section 10 and for otherwise holding the fitting 33. The fitting 33 is provided with an upper threaded stud 36 that screws into a compatible socket 37 provided at the lower end of the sucker-rod 11.

The end of the stub 32 is provided with a recess 40 that receives one end of a compression spring 41, constituting a resilient means, located within the female section 10. The other end of the spring 41 engages the top of pawl 21. The spring 41 acts to urge the pawl 21 in a direction toward its fully extended limit in which the lower ends of the cams 25 and 26 seat on the partition 16.

The male section 12 includes a latch body 50, the lower end of which is provided with a threaded socket 51 to receive the plunger-rod 13. The latch body 50 includes an elongate T-shaped plug 52 having a transverse locking tongue 53. Upon insertion of the plug 52 into the socket 15, and upon alignment of the female section 10 and latch body 50 in a specific relative angular position, the locking tongue 53 will pass freely through the oval-shaped slot 17. It will be noted that the space between the stop shoulders 20, as provided by the slot 17, is of a greater dimension than the transverse dimension, yet less than the longitudinal dimension of the locking tongue 53 so that the locking tongue 53 moves through the slot 17 in only one relative angular position of the latch body 50 and female section 10.

The top and sides of the locking tongue 53 are rounded to provide opposed follower surfaces 54 and 55 engageable respectively with the cams 25 and 26 upon insertion through the slot 17. The underside of the locking tongue 53 is flat at opposite ends to provide abutments 56 engageable with the stop shoulders 20 upon complete insertion of the locking tongue 53 through the slot 17 and upon relative turning of the latch body 50 and female section 10 to another relative angular position, as is shown in FIGS. 1 and 2.

Figure 6:
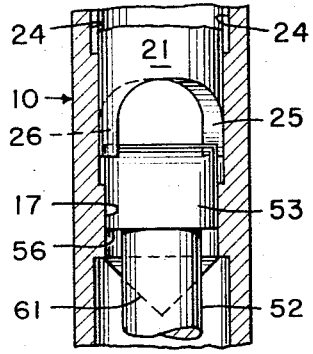
FIG. 6 is a fragmentary, cross sectional view showing the latch body partially inserted.
Figure 4:
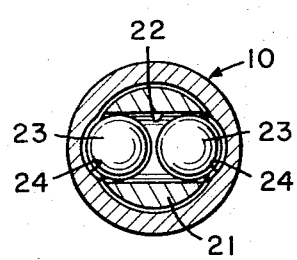
FIG. 4 is a cross sectional view as taken along line 4—4 of FIG. 1.
Figure 5:
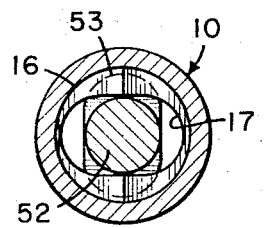
FIG. 5 is a cross sectional view as taken along line 5—5 of FIG. 1.
Figure 3:
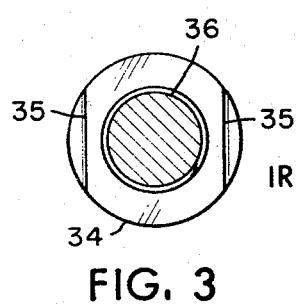
FIG. 3 is a cross sectional view as taken along line 3—3 of FIG. 2.

This relative turning of the female section 10 and the latch body 50 to a locked position is accomplished under the action of pawl 21. As the locking tongue 53 moves upwardly through the slot 17, the tongue 53 engages the oppositely disposed cams 25 and 26, as shown in FIG. 6, and urges the pawl 21 upwardly to a retracted position against loading of spring 41. The latch body 50 is constrained to prevent rotation. The female section 10 cannot rotate relative to the latch body 50 while the locking tongue 53 is moving upwardly through the slot 17 because of the interengagement of the locking tongue 53 with the partition 16.

However, when the locking tongue is fully inserted, the tongue 53 is clear of the partition 16 so that the pawl 21 will operate automatically under spring loading to cause rotation of the female section 10. Obviously, the pawl 21 cannot turn within the female section 10, but as the pawl 21 is urged under the loading of spring 41 to its extended position, the interengagement of the cams 25 and 26 with the rounded follower surfaces 54 and 55 of the locking tongue 53 will cause the pawl 21, and hence the female section 10, to turn 90 degrees relative to the locking tongue 53 so that the tongue abutments 56 engage the stop shoulders 20 to couple the latch body 50 and female section 10. The resilient loading of the pawl 21 holds the locking tongue 53 against the stop shoulders 20 to preclude unintentional turning which would cause realignment of the locking tongue 53 and slot 17 and hence preclude an unintentional release and withdrawal of the latch body 50.

When the latch body 50 is operatively coupled to the female section 10, the body 50 engages the lower end 14 of the female section 10. The latch body 50 is provided with a plurality of passages 57 that communicate with the interior of the socket 15. When the coupling is operatively connected and used in association with a down-hole oil well pump, the passages 57 provide for the free flow of liquid in the well into the socket 15 to flush sand and other foreign material out of the socket 15. This flushing action prevents any packing of sand or other material in the socket 15 that might hinder or obstruct withdrawal of the T-shaped plug 52 upon release and disconnection of the coupling parts.

Located below the partition 16 and in the socket 15 are a pair of wedge-shaped guides 60 and 61, the guides 60 and 61 tapering toward the open end of the socket 15. As is best seen in FIG. 2, the wedge-shaped guides 60 and 61 are of unequal length and are placed diametrically opposite each other. Upon insertion of the plug 52 into the socket 15, the opposite ends of the locking tongue 53 engage the wedge-shaped guides 60 and 61, thereby causing the female section 10 and all of its component parts, to turn relative to the latch body 50 to a relative angular position in which the locking tongue 53 is aligned with the slot 17 for passage therethrough. The wedge-shaped guide 60 is longer than the cooperating wedge-guide 61 so that one end of the locking tongue 53 will engage the guide 60 and be slightly turned thereby before the opposite end of the tongue 53 engages the other guide 61. This initial turning action of the tongue 53 prevents any jamming of the tongue 53 on the guides 60 and 61 incident to insertion into the socket 15.

It is thought that the usage and functional advantages of the sucker-rod coupling have become fully apparent from the foregoing description of parts, but for completeness of disclosure the installation of the coupling will be briefly described.

It will be assumed that the latch body 50 is connected to the plunger-rod 13 which is then placed in location in the well tube. The top fitting 33, the spring 41, the pawl 21, complete with ball bearings 23, are then pre-assembled. For example, the ball bearings 23 are placed in position in the transverse hole 22 of the pawl 21, and the pawl 21 is inserted through the top end 30 of the female section 10, with the pawl end having the cams 25 and 26 inserted first and with the pawl 21 orientated so that the ball bearings 23 are aligned with the longitudinal grooves 24. The pawl 21 is then dropped into position against the partition 16. The compression spring 41 is placer on top of the pawl 21, and the top fitting 33 is screwed in place with the upper end of the spring 41 seating in the recess 40. The top fitting 33 is then attached to the sucker-rod 11.

Connection is made between the female section 10 and latch body 50 by lowering the female section 10, now attached to the sucker-rod 11, onto the latch body 50 attached to the plunger-rod 13. Upon entry of the locking tongue 53 into the socket 15, the wedge-shaped guides 60 and 61 will engage the locking tongue 53, and cause relative turning of the female section 10 to align the locking tongue 53 with the slot 17 as the downward movement of the female section 10 progresses. Upon continued downward movement, the locking tongue 53 passes into and through the slot 17. In moving through the slot 17, as shown in FIG. 6, the locking tongue 53 engages the opposed cams 25 and 26 and retracts the pawl 21 upwardly from its extended limit to a retracted position against the loading of spring 41.

When the locking tongue 53 has passed completely through the slot 17 and clears the partition 16, so that it is no longer guided by the side walls of the partition 16 defining the slot 17, the direction of travel of the locking pawl 21 is reversed. As the pawl 21 moves toward its extended position under the loading of spring 41, the cams 25 and 26 engage the opposite sides at the ends of the locking tongue 53, and cause the pawl 21 and the female section 10 to turn as a unit automatically through 90 degrees to a relative angular position of the female section 10 and latch body 50 in which the overhanging ends of the locking tongue 53 now straddle the oval-shaped slot 17 and in which the end abutments 56 engage the stop shoulders 20. The locking tongue 53 is held in this locking position under pressure of the pawl 21 derived from the loading of spring 41. The latch body 50 and female section 10 are now coupled.

Release and disconnection of the latch body 50 and female section 10 is effected quite simply by manually rotating the sucker-rod 11 and the attached female section 10 as a unit relative to the latch body 12 through 90 degrees in a direction so that the opposite follower surfaces 54 and 55 of the locking tongue 53 will ride along the associated cams 25 and 26 to push the pawl 21 upwardly in a direction toward its retracted position. Upon such rotation, the slot 17 will move from a misaligned locked position with respect to locking tongue 53 toward a relatively aligned position. When the locking tongue 53 is aligned with the oval-shaped slot 17, the locking tongue 53 may be withdrawn through the slot 17 and the plug 52 removed from the socket 15.

The withdrawal and disconnection of the latch body 50 from the female section 10 is facilitated and made partly automatic by the downward pressure exerted by spring 41 on the locking tongue 53 through the locking pawl 21. In other words, the pawl 21 under the loading of spring 41 acts to eject the locking tongue 53 through the slot 17.

It will be apparent that the relative positions of the female section 10 and latch body 50 can be reversed so that the latch body 50 is uppermost, without detracting from the effectiveness of the coupling.

Although the invention has been described by making detailed reference to a single preferred embodiment, such detail is to be understood in an instructive, rather than in any restrictive sense, many variants being possible within the scope of the claims hereunto appended.

We claim:
1. A coupling, comprising:
 (a) an elongate female section having a socket at one end,
 (b) a male section having a latch body received in the socket, the latch body including a transverse locking tongue, said tongue having at the upper end thereof a crown portion defining a convex surface of revolution, said crown portion being of uniform cross section throughout the length thereof,
 (c) latch body guide means in the female section permitting operative insertion of the latch body into the socket in one relative angular position of the latch body and female section,
 (d) stop means in the female section and on the upper side of said latch body guiding means engaging the tongue to retain the latch body in the socket in another relative angular position of the latch body and female section upon such operative insertion,
 (e) a pawl reciprocatively and non-rotatably mounted in the female section to preclude relative turning therebetween, the pawl including a pair of diagonally disposed, oppositely facing cams at the lower end thereof, said cams having a common soffit portion extending therebetween and defining a concave surface of revolution, the radius of said concave surface being slightly larger than the radius of said convex surface, said concave surface being engageable with the convex surface of said transverse locking tongue to turn the latch body to the last said angular position to couple the male and female sections, and
 (f) said surfaces of revolution engaging at the apex of said convex surface to provide maximum mechanical advantage during initial disengagement.

2. A coupling, comprising:
 (a) an elongate female section having a socket at one end,
 (b) a male section having a latch body received in the socket, the latch body including a transverse locking tongue,
 (c) latch body guiding means in the female section permiting operative insertion of the latch body into the socket in one relative angular position of the latch body and female section,
 (d) at least one wedge-shaped guide carried by the inner face of the socket between said latch body guiding means and the open end of said socket and tapered downwardly toward the open end of the socket, the wedge-shaped guide engaging the transverse locking tongue upon insertion of the latch body and aligning the latch body and female section axially and in the said one angular position,
 (e) stop means on the upper side of said latch body guiding means engaging the locking tongue to retain the latch body in the socket in another relative angular position of the latch body and female section, and (f) means in the female section causing relative turning of the latch body and female section to the last said angular position upon complete insertion of the latch body.

3. A coupling as defined in claim 2, in which:

(g) a pair of diametrically opposed wedge-shaped guides are provided in the socket and tapered toward the socket end of the female section to provide a substantially pointed end to each guide, the wedge-shaped guides engaging the ends of the transverse locking tongue upon insertion of the latch body to deflect the tongue and align the latch body and female section in the said one angular position.

4. A coupling as defined in claim 3, in which:

(h) one of the wedge-shaped guides extends closer to the open end of the socket than the other guide to engage one end of the transverse locking tongue to deflect said tongue initially thereby to start relative turning of the latch body and female section before engagement of the said other guide with the other end of the tongue.

5. A coupling, comprising:

(a) an elongate female section having a socket at one end, (b) a male section having a latch body received in the socket, the latch body including a locking tongue, (c) means in the female section permitting operative insertion of the latch body into the socket in one relative angular position of the latch body and female section, (d) stop means engaging the tongue to retain the latch body in the socket in another relative angular position of the latch body and female section upon such operative insertion, and (e) means in the female section engaging and turning the latch body to the last said angular position to couple the male and female sections, (f) one of the said sections being provided with a passage, below the stop means, communicating the socket with the outside of said sections to enable the circulation of fluid in the socket for removal of foreign material from the socket below the means for coupling the male and female sections.

References Cited

UNITED STATES PATENTS

| | | | |
|---|---|---|---|
| 1,645,428 | 10/1927 | Hosmer et al. | 287—103 |
| 1,762,572 | 6/1930 | Davidson | 287—103 |
| 1,916,449 | 7/1933 | Tompkins | 285—376 X |
| 2,066,956 | 1/1937 | Williams. | |
| 2,291,151 | 7/1942 | Dunn | 192—67 X |
| 3,168,340 | 2/1965 | Howard | 285—376 X |
| 3,219,373 | 11/1965 | Sutliff | 285—86 X |
| 3,275,354 | 9/1966 | Sutliff et al. | 285—86 X |

CARL W. TOMLIN, *Primary Examiner.*

R. G. BERKLEY, *Assistant Examiner.*